Jan. 9, 1934.  F. FISCHER  1,943,064
ELECTRICAL MACHINE
Filed Nov. 25, 1930   3 Sheets-Sheet 1

INVENTOR
FRITZ FISCHER
BY
ATTORNEYS.

Inventor:
Fritz Fischer
by Lora & Kehlenbeck
Attorneys

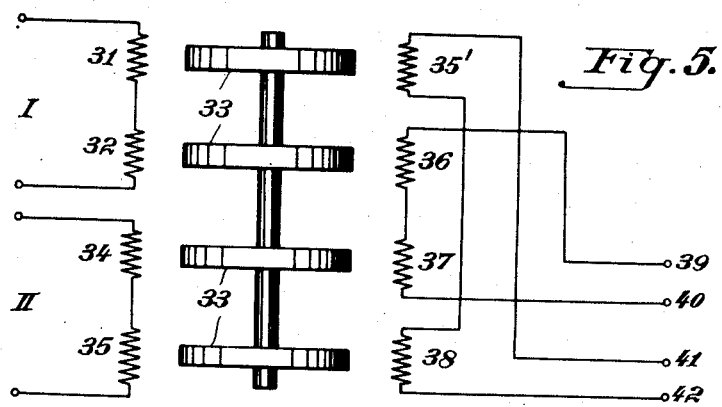
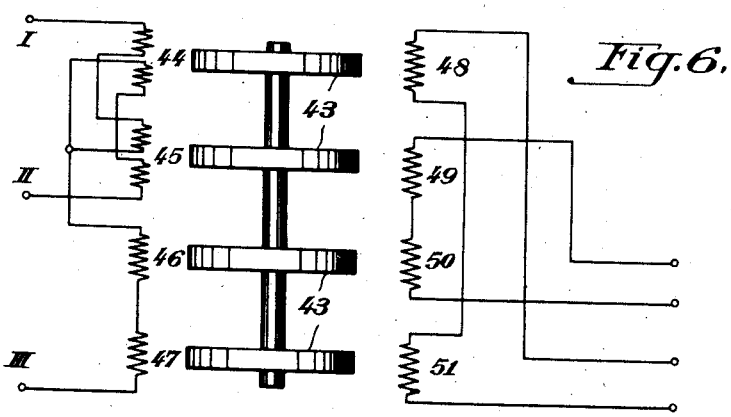
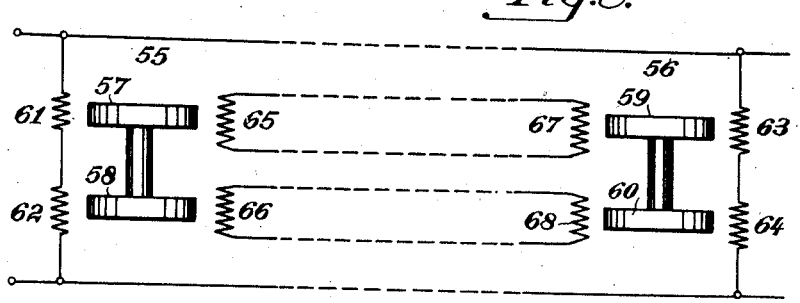

Patented Jan. 9, 1934

1,943,064

UNITED STATES PATENT OFFICE 1,943,064

ELECTRICAL MACHINE

Fritz Fischer, Berlin-Charlottenburg, Germany, assignor to Siemens & Halske, Aktiengesellschaft, Siemensstadt, near Berlin, Germany, a corporation of Germany Application November 25, 1930, Serial No. 497,967, and in Germany November 29, 1929

4 Claims. (Cl. 172—120)

The present invention relates to rotary electrical machines (having no slip rings).

The general object of the present invention is to produce a machine which is in operation the equivalent of well-known rotary machines of the type used for producing or transmitting synchronous or asynchronous motion. It is particularly applicable to multi-polar machines of this type.

It is the purpose of the invention to provide an arrangement by which machines of this type can be simplified. In the past, particularly in machines having a considerable number of poles, it has been difficult to get all the windings on the rotor and this has made such machines impracticably large and expensive.

Every synchronous or asynchronous machine has a plurality of windings the self-impedances of which therefore set up a certain number of mutual impedances. Some of these impedances change with variations in only a single mechanical variable, for instance, the shift of the rotor.

According to the present invention, machines are produced which are the equivalents of the well-known machines by the combination of a plurality of electrical devices, hereinafter termed "component machines".

This term "component machines" as used in the present specification and claims, is to be interpreted as defining an electrical device having the following characteristics: Such device comprises a rotor carrying no windings and a stator provided with windings. The stator windings, whatever their number may be, are so arranged or connected that together they will have two self-impedances, and that there will be a resulting mutual impedance between said windings. The iron bodies of both rotor and stator are provided with teeth adapted to come into and out of registry as the rotor rotates, and when a plurality of such "component machines" is combined in accordance with my invention, the stators of such component machines will have the same number of teeth, and the rotors of such component machines will be alike (among themselves) as to the number and pitch of their teeth. As a rule, the stator of a component machine such as are utilized to build up machines according to my present invention, has only two windings each with its own self-impedance. It is however also feasible to provide a greater number of windings on the stator, for instance four, and to connect these in such a manner that these windings together will have only two self-impedances. In this case there would be but two pairs of external terminals, and a self-impedance could be determined or measured between the two terminals of the same pair.

In my invention, such "component machines" are combined in such numbers that the number of mutual impedances is equal to the number of mutual impedances in the machine to be duplicated. The mutual impedances are such that they vary in substantially the same manner as those of the machine to be copied.

A further object of my invention is to provide synchronous or asynchronous machines in which I may use a rotor which carries no windings so that I do away with the use of any slip rings and the disadvantages connected therewith.

Further objects and advantages of the invention will appear more fully from the following description taken in conjunction with the accompanying drawings which form a part thereof.

In the drawings:

Figs. 5 to 8 show diagrammatically various machines embodying the present invention.

Figure 1:
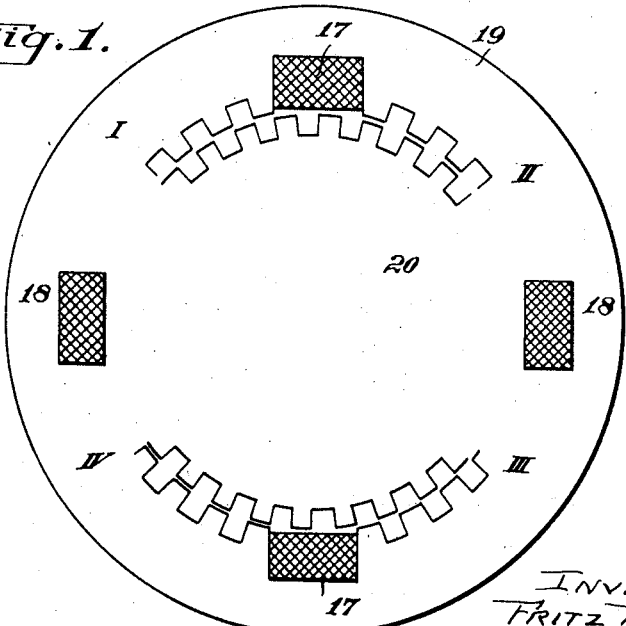

Fig. 1 shows a component machine suitable for use as an element in carrying out the present invention. The stator 19 carries two windings 17, 18 having self-impedance so that there are in effect two self-impedances and one mutual impedance between such windings, such mutual impedance varying with the angular shift of the rotor. The rotor 20 carries no windings. The stator and rotor are provided with teeth, the width of each tooth being equal to the width of each gap between the teeth, and the width of the teeth and of the gaps is the same for stator and rotor. The stator is divided into four quadrants, I, II, III and IV, the teeth on the stator being staggered in the various quadrants in such a manner that, when the teeth of the rotor are opposite the gaps on the stator in quadrants I and III, other teeth are opposite the teeth on the stator in quadrants II and IV. The value of the self-impedances remains practically constant in this form.

Figure 2:
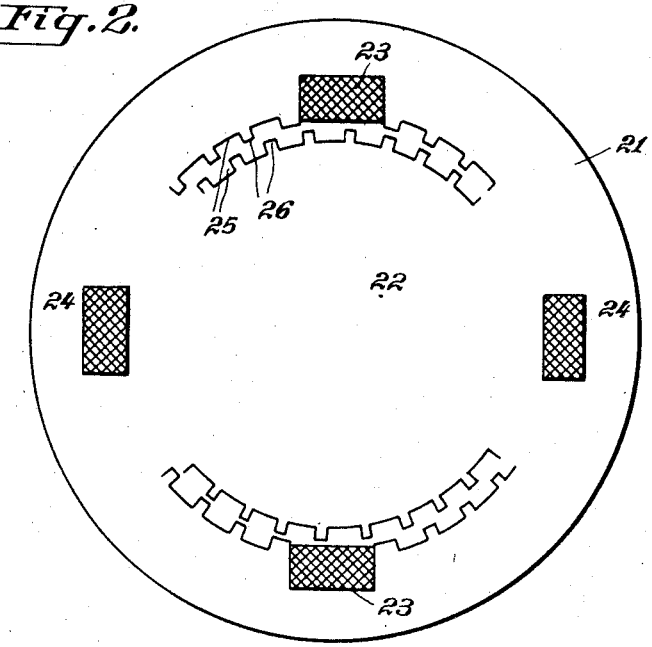
Figs. 1 to 4 show various types of component machines which may be used as elements of the complete machines shown in the remaining figures.

Fig. 2 shows an arrangement similar to Fig. 1 having a stator 21 and a rotor 22 and two windings 23, 23 and 24, 24 on the stator. In this form, however, the teeth 26 are only about one-third as wide as the gaps 25. The teeth on the stator are again staggered as in Fig. 1 so that when the rotor teeth in one quadrant are opposite the stator teeth, in the adjacent quadrants they are opposite the stator gaps. This construction causes variation both in the mutual impedance and in the self-impedances.

Figure 3:
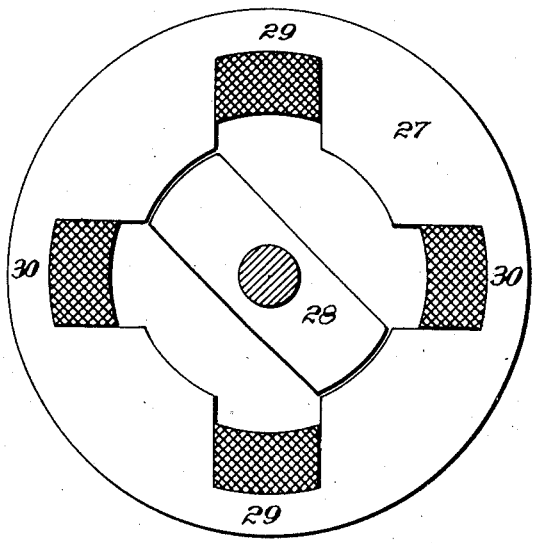

Fig. 3 shows still another form of unwound rotor construction having a stator 27, a rotor 28 and two windings 29, 29 and 30, 30 on the stator. In this form, however, there are only four poles or teeth on the stator and two on the rotor instead of the great number of teeth shown in Figs. 1 and 2.

Figure 4:
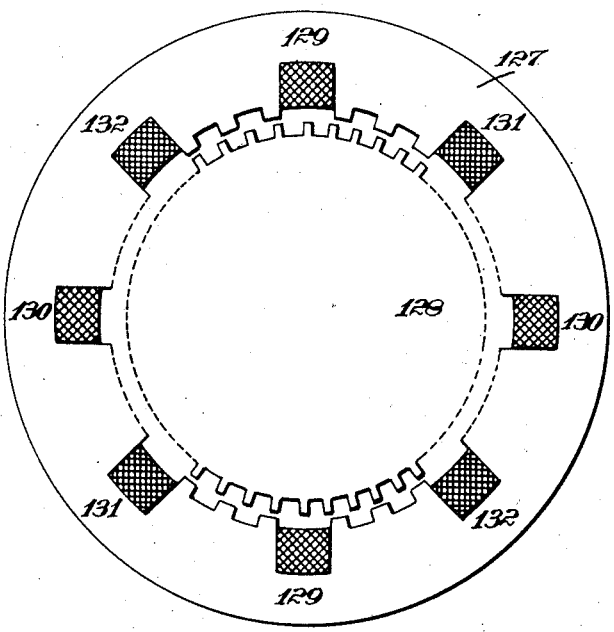

Fig. 4 shows the use of more than two windings on the stator. In this form, a stator 127 and a rotor 128 having teeth similar to those shown in Fig. 2 are provided. Four windings 129, 129, 130, 130, 131, 131 and 132, 132 are provided. It should be understood, however, that the windings 129 and 130 are connected as are the windings 131 and 132 so that in the circuit each of the windings forms only a part of a winding having self-impedance. Such an arrangement may be used where a large number of windings is desirable.

I wish it to be clearly understood that the machines shown in the figures described above are merely intended to illustrate various elements or "component machines" which may be used as parts of the combinations to be described below, and that these elements per se are not claimed to be the invention. However, it appears necessary to disclose these specific component machines so that any person wishing to utilize the combinations disclosed in the figures to be described hereafter would be able to construct the same. It is to be understood that any of the component machines shown in Figs. 1 to 4 may be used in the complete machines shown in Figs. 5 to 8.

In addition, in explanation of Fig. 4, I wish to make it clear that the component machines shown in this figure contains only two self-impedances, although four windings are shown. Two windings connected in series or in parallel in the same circuit or phase form in effect only a single self-impedance within the meaning of the term as used herein. Thus in Fig. 4 the pair of windings 129 and 130 may be connected so as to have a single self-impedance, and the same remark will apply to the pair of windings 131 and 132. It will therefore be understood that a self-impedance may be set up by a plurality of windings, each of which forms a part thereof, as long as these windings are in the same circuit or, in the case of a polyphase circuit, in the same phase of the circuit.

Fig. 5 shows a simple form of machine embodying the invention and intended to be the equivalent of a two phase asynchronous motor having four windings, which, as is quite evident, will have four mutual impedances varying with the rotor shift. In this machine, four component machines are made use of so that there will be present eight self-impedance windings and four mutual impedances. The two phase voltage is supplied to the left hand side of the figure, the phases being marked I and II. The stator windings 31 and 35' and the rotor 33, herein shown as an unwound type, constitute a component machine with windings 31 and 35' having self-impedance which set up a mutual impedance between such windings. In the same way, windings 32, 36 and their rotor 33; windings 34, 37 and their rotor 33; and windings 35, 38 and their rotor 33 each constitute a component machine. All the rotors 33 are mounted on a single shaft so that they rotate together, but each of such rotors is shifted by an angle of 90 electrical degrees with respect to the adjacent ones. Windings 31 and 32 having self-impedance are connected in the phase I and winding 34 and 35 in the other phase II, which is in quadrature with the first phase. Windings 35' and 38 are connected in series, and windings 36 and 37 are likewise connected in series. It will thus be noted that the component machines have their stator windings connected electrically, since each component machine has its stator windings connected to the stator windings of at least two other component machines whereby all the machines are tied together, and their rotors coupled mechanically. The contacts 39, 40, 41 and 42 of the windings 35', 36, 37 and 38 having self-impedance are connected in the same manner as the rotor windings of a two phase asynchronous motor with bi-phase winding on the rotor. Each of the mutual impedances corresponds to one of the variable mutual impedances of a two phase asynchronous machine.

Fig. 6 shows a similar arrangement in which the current is supplied by a three phase circuit using the well known Scott connection. In this case, two of the phases, such as I and II, each supply a portion of the current to the windings 44 and 45 having self-impedance, such windings being the equivalent of the single impedance windings 31 and 32 in Fig. 5. In this machine, impedance stator windings 44, 48 and their rotor 43; windings 45, 49 and their rotor 43; windings 46, 50 and their rotor 43; and windings 47, 51 and their rotor 43 each constitute a component machine. As in Fig. 5 each of these machines has two windings setting up a mutual impedance between the self-impedances of such windings. It will be noted that windings 48 and 51 and windings 49 and 50 are connected in series as in Fig. 5. This figure shows that the windings referred to may be formed by two windings in different phases which are nevertheless equivalent to a single winding having self-impedance.

Figure 7:
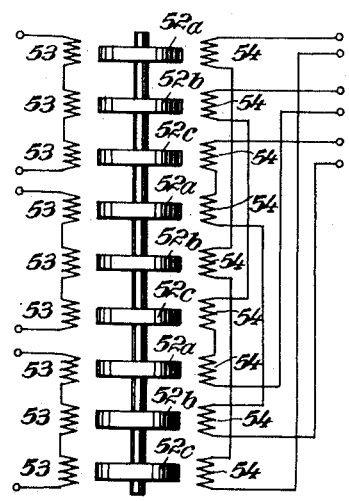

A machine which is equivalent to a three phase asynchronous motor with six windings and nine variable mutual impedances is shown in Fig. 7. Such a machine comprises nine component machines. Each of the phases of the circuit supplies current to three of the windings having self-impedance, while the other windings are supplied from a suitable source. It will be noted that the rotors may be divided into groups of three, each of such groups being provided with windings 53 fed by one of the phases of the circuit. The opposite windings 54 are divided into three groups each of such groups comprising three windings connected in series, and it will be noted that one of the windings of each group operates with a rotor of each group. In this way, the windings of the three groups are mutually interconnected so that the component machines are tied together electrically while the rotors are coupled to one another mechanically since they are mounted on a single shaft. The three rotors 52a are arranged in phase with each other, as are rotors 52b and 52c. However, rotors 52a are out of phase by 120 electrical degrees with rotors 52b, and the same relation exists between rotors 52b and 52c. In this way, each rotor is out of phase by 120 electrical degrees with each of the adjacent rotors. The windings 54 are connected in the same manner as the rotor windings of a normal three phase asynchronous motor.

Fig. 8 shows a two phase arrangement for the synchronous transmission of motion equivalent to an arrangement in which the transmitter and receiver each have a single phase winding on the stator and a two phase winding having two self-impedances on the rotor. Such an arrangement has two variable mutual impedances in the transmitter and two in the receiver. The transmitter 55 and the receiver 56 each consist of two component machines. In the transmitter, windings 61 and 65 and rotor 57 and windings 62, 66 and rotor 58; and in the receiver, windings 63 and 67 and rotor 59 and windings 64 and 68 and rotor 60 each constitute a component machine. The corresponding windings 61, 62, 63 and 64; windings 65 and 67 and windings 66 and 68 are all suitably connected, the windings 61, 62 and 63, 64 being connected in series parallel arrangement to the same alternating current supply. Rotors 57, 58 and 59, 60 are each out of phase by 90° with regard to the other of the pair. The receiver 56 will operate in synchronism with the rotation of the transmitter 55. By using a different number of pole pairs in receiver and transmitter, any desired transmission of movement can be obtained with a device of this type. By using three component machines in each element, the equivalent of a three phase synchronous system can be produced.

From the above description, it is believed that any person skilled in the art will be able to practice the invention. For instance, to build a machine of the type shown in Fig. 5, it would only be necessary to mount the rotors 20 of four component machines of the type shown in Fig. 1 on a single shaft, to connect the windings 17 in the manner of windings 31 to 35 and the windings 18 in the manner of windings 35' to 38 to proper sources of current. Such a device would then operate as a two-phase asynchronous machine. It is quite evident that the equivalent of any synchronous or asynchronous machine may be made according to the present invention by using as many component machines having their rotors coupled mechanically and their stator windings connected electrically as there are mutual impedances in the machine to be duplicated.

I wish it to be understood that my invention is applicable to generators as well as to motors.

While I have described herein several embodiments of my invention, I wish it to be understood that I do not intend to limit myself thereby except within the scope of the appended claims.

I claim:

1. An electrical machine with windings having more than two self-impedances, comprising a plurality of similar component machines each having as its elements a toothed rotor and a stator and windings on the stator, said rotor having no windings thereon and the rotors of said component machines having all the same tooth pitch, the stator windings of any one of said component machines having only two self-impedances altogether and being in such relation to each other that there will be a mutual impedance between them, at least one of said impedances being variable with the rotor shift, said rotors being coupled mechanically and said windings of different component machines being connected electrically.

2. A rotary electrical machine with windings having a plurality of mutual impedances varying during rotation, said machine comprising a plurality of similar component machines the number of which is equal to that of said mutual impedances, each of said component machines having as its elements a toothed rotor and a toothed stator and windings on the stator, said rotor having no windings thereon and said rotors having all the same tooth pitch, the stator windings of any one of said component machines having only two self-impedances altogether and being in such relation to each other that there will be a mutual impedance between them, said mutual impedances being variable with the rotor shift, the teeth on the stator being divided by the windings into an even number of sections, the teeth in each section being staggered with respect to the teeth in the adjacent sections in such a manner that when the teeth in one section are opposite the tooth gaps of the rotors, the teeth in the adjacent sections are opposite the teeth of the rotors, said windings of different component machines being connected electrically and said rotors being coupled mechanically, each rotor being out of phase with the adjacent rotors.

3. A polyphase rotary electrical machine equivalent to a synchronous or asynchronous machine with windings having a plurality of mutual impedances varying during rotation, said machine comprising a plurality of similar component machines the number of which is equal to that of said mutual impedances, each of said component machines having as its elements a toothed rotor and a stator and windings on the stator, said rotor having no windings thereon and said rotors having all the same tooth pitch, the stator windings of any one of said component machines having only two self-impedances altogether and being in such relation to each other that there will be a mutual impedance between them, said mutual impedances being variable with the rotor shift, some of said windings being connected in each phase, said windings of different component machines being connected electrically and said rotors being coupled mechanically, each rotor being out of phase with the adjacent rotors.

4. A polyphase rotary electrical machine equivalent to a synchronous or asynchronous machine with windings having a plurality of mutual impedances varying during rotation, said machine comprising a plurality of similar component machines the number of which is equal to that of said mutual impedances, each of said component machines having as its elements a toothed rotor and a toothed stator and windings on the stator, said rotor having no windings thereon and said rotors having all the same tooth pitch, the stator windings of any one of said component machines having only two self-impedances altogether and being in such relation to each other that there will be a mutual impedance between them, the teeth on the stator being divided by the windings into an even number of sections, the teeth in each section being staggered with respect to the teeth in the adjacent sections in such a manner that when the teeth in one section are opposite the tooth gaps in the rotors, the teeth in the adjacent sections are opposite the teeth in the rotors, said mutual impedances being variable with the rotor shift, some of said windings being connected in each phase, said windings of different component machines being connected electrically and said rotors being coupled mechanically, each rotor being out of phase with the adjacent rotors.

FRITZ FISCHER.